United States Patent
Cozens et al.

(10) Patent No.: US 8,730,794 B2
(45) Date of Patent: May 20, 2014

(54) PRIORITY SERVICE PROTECTION

(75) Inventors: John Nicholas Cozens, London (GB); Graham Willmott, Bristol (GB); Christopher James Vowden, Bristol (GB)

(73) Assignee: Gos Holdings Limited, Bailiwick of Jersey (GB)

( * ) Notice: Subject to any disclaimer, the term of this patent is extended or adjusted under 35 U.S.C. 154(b) by 1428 days.

(21) Appl. No.: 11/720,472

(22) PCT Filed: Nov. 30, 2005

(86) PCT No.: PCT/GB2005/004591
§ 371 (c)(1), (2), (4) Date: Nov. 15, 2007

(87) PCT Pub. No.: WO2006/059099
PCT Pub. Date: Jun. 8, 2006

(65) Prior Publication Data
US 2008/0170499 A1 Jul. 17, 2008

(30) Foreign Application Priority Data
Nov. 30, 2004 (GB) .................................. 0426277.0

(51) Int. Cl.
*G01R 31/08* (2006.01)

(52) U.S. Cl.
USPC ............................. 370/225; 370/238; 370/468

(58) Field of Classification Search
USPC ........................................................ 370/225
See application file for complete search history.

(56) References Cited

U.S. PATENT DOCUMENTS

| | | | | |
|---|---|---|---|---|
| 5,933,422 A | * | 8/1999 | Kusano et al. | 370/331 |
| 6,411,598 B1 | * | 6/2002 | McGlade | 370/217 |
| 6,594,268 B1 | * | 7/2003 | Aukia et al. | 370/400 |
| 6,616,350 B1 | * | 9/2003 | de Boer et al. | 398/9 |
| 6,925,054 B1 | * | 8/2005 | Atterton et al. | 370/218 |
| 7,177,268 B2 | * | 2/2007 | Shinagawa | 370/217 |
| 7,345,994 B2 | * | 3/2008 | Sivabalan et al. | 370/228 |
| 7,684,322 B2 | * | 3/2010 | Sand et al. | 370/230 |
| 2002/0141403 A1 | * | 10/2002 | Akahane et al. | 370/389 |
| 2003/0058798 A1 | * | 3/2003 | Fleischer et al. | 370/238 |

FOREIGN PATENT DOCUMENTS

| | | | | |
|---|---|---|---|---|
| EP | 1246410 A2 | * | 10/2002 | H04L 12/56 |
| EP | 1335534 A2 | | 8/2003 | |
| EP | 1383261 A1 | * | 1/2004 | H04J 3/16 |

OTHER PUBLICATIONS

PCT International Search Report dated Oct. 2, 2006 for International application No. PCT/GB2005/004591; Applicant U4EA Technologies Ltd.

* cited by examiner

*Primary Examiner* — Steven H Nguyen
(74) *Attorney, Agent, or Firm* — Marsh Fischmann & Breyfogle LLP; Kent A. Lembke (57) ABSTRACT

There is disclosed a method and apparatus for allocating resources in a transmission medium, in which method data is associated with different classes of traffic, the different classes of traffic being associated with different priority levels, wherein resources are selectively reserved on the transmission medium for traffic classes in accordance with an associated priority level.

51 Claims, 4 Drawing Sheets

PSP Sequence for protecting Quality Classes

FIG. 1

Figure: PSP Sequence for protecting Quality Classes

FIG. 2

VoIP bandwidth assignment - basic

FIG. 4

Priority Service Protection determines the order in which guaranteed quality for data services is lost as the number of VoIP calls increases

PRIORITY SERVICE PROTECTION

RELATED APPLICATIONS

This application is a national phase of PCT Application No. PCT/GB2005/004591, filed Nov. 30, 2005, entitled, "PRIORITY SERVICE PROTECTION," which claims priority from GB Patent Application No. GB20040026277, filed on Nov. 30, 2004, which are hereby incorporated by reference into this application.

BACKGROUND TO THE INVENTION

1. Field of the Invention

The present invention relates to the allocation of resources on a transmission medium. The invention particularly but not exclusively relates to the allocation of resources for data on multiple media, and the protection of priority services when one or more of the multiple media fail.

2. Description of the Related Art

In data transmission systems data packets are transmitted on links. In many typical deployments data traffic is transmitted on multiple links, or one or more reserve links are provided to provide back-up to a main link in event of the main link failure.

Where one of multiple links fails, or when a main (or single) link fails, a mechanism must be provided to deal with the traffic allocated to the failed link.

In the event of one of multiple links failing, simply allocating the traffic from the failed link to one or more other links may not be satisfactory, since the one or more other links may not have the capacity to take their existing traffic in addition to the traffic from a failed link.

In addition, traffic is typically associated with a quality of service. Different data packets or data flows may be allocated to a particular traffic class, and that traffic class may be associated with a particular priority level. In addition to considering the allocation of the traffic volume amongst remaining available links or redundant links, it is also necessary to consider the priority of the traffic when all of the traffic will not fit on the available link space.

Simple proportional reduction of bandwidth for each type of traffic is unlikely to give desirable behaviour. For example, an application requiring 64 Kbps to work satisfactorily may break down completely when it is only given 32 Kbps, rather than working only half as well.

On any individual link, whether provided as a single link or one of a plurality of links, it may also be necessary to dynamically allocate traffic to the link as a result of changing conditions.

The changing conditions may be the presence or absence of different types of traffic. The changing conditions may be due to a change in capacity on a link. In any case where conditions change, the allocation of traffic to the link may need to be controlled to accommodate such changes.

It is an aim of the invention to provide an improved technique for allocating traffic to a link.

SUMMARY OF THE INVENTION

In accordance with one aspect of the invention there is provided a method of allocating resources in a transmission medium, in which method data is associated with different classes of traffic, the different classes of traffic being associated with different priority levels, wherein resources are selectively reserved on the transmission medium for traffic classes in accordance with an associated priority level.

There is preferably provided a plurality of transmission media, allocation rules determining the allocation of traffic to one or more of the transmission media, wherein responsive to failure of transmission media traffic allocated to the failed transmission media is allocated to one or more of the other transmission media.

Traffic allocated to the failed transmission media may be allocated to one or more of the other transmission media in dependence on the traffic class.

The step of selectively reserving resources on the transmission medium may include reserving an amount of resource for at least one traffic class, where traffic associated with said traffic class is allocated to the reserved resource in accordance with an associated priority level.

If the resource reserved for the at least one traffic class is not fully utilised, data associated with a further traffic class may be selectively allocated to any unused resource in accordance with an associated priority level.

A transmission medium may have a threshold level, the traffic being allocated to the transmission medium within the threshold level of the transmission medium. The threshold level may correspond to the maximum capacity of the transmission medium. The threshold level may be below the maximum bandwidth of the transmission medium. The threshold may be a value of 90% or more of the bandwidth of the transmission medium. Once the threshold is reached, any remaining data may be allocated to the medium on a best effort basis.

There may be provided a plurality of media. A predetermined set of traffic may be allocated to ones of the media.

Responsive to a failure of a transmission medium the predetermined set of traffic allocated to that transmission medium may be re-allocated to one or more other transmission media in combination with the predetermined traffic allocated to said one or more other transmission media.

The combined traffic thus associated with any transmission medium may be allocated thereto in dependence on the priority associated with respective traffic classes. The priority may be based on a quality of service class. The quality of service class may be based on one or more acceptable levels of: throughput; delay; loss; jitter; costs; or reliability for the traffic class.

The invention further provides in one aspect a method of allocating resources on transmission media having respective capacities, at least some data being associated with a traffic class having an associated priority level, the method comprising allocating data to at least one transmission medium, wherein responsive to failure of a transmission medium, traffic allocated to the failed transmission medium is allocated to at least one further transmission medium, the traffic being allocated thereto in accordance with a priority associated with the traffic.

The traffic may be allocated to the at least one transmission medium until a capacity of the link is met. The capacity of the transmission medium may be determined by the transmission medium bandwidth.

The remaining traffic may be allocated to the transmission medium on a best effort basis.

Traffic from a failed transmission medium may be allocated to the at least one further transmission medium in preference to the original traffic on the at least one further transmission medium.

At least one traffic class may be identified as a critical service, wherein traffic being critical service traffic is first allocated in accordance with the relative priorities of such traffic, and then the remaining traffic is allocated in accordance with the relative priorities of such traffic.

In another aspect the invention provides a method of allocating traffic in which traffic is transmitted on at least two transmission media, traffic being associated with a traffic class, each traffic class being associated with a priority, and each media having a respective resource for traffic, wherein responsive to a failure on one transmission medium, the combined traffic for the at least two transmission media is allocated to the remaining at least one transmission medium in dependence on the priority of the traffic class, wherein once the resource of the at least one remaining transmission medium has been used up, traffic associated with any remaining traffic is allocated to the at least one remaining transmission medium on a best-effort basis.

In another aspect the invention provides a method of allocating traffic in a transmission medium, the method comprising allocating resource to traffic on a dynamic basis, wherein at least one type of traffic is reserved a fixed proportion of the resource of the transmission medium when present.

The at least one type of traffic includes voice or video traffic.

The invention provides, in another aspect, a method of allocating traffic in a transmission medium, wherein the transmission medium capacity is variable, the method further comprising dynamically allocating traffic to the link in accordance with a traffic priority in dependence on a current capacity of the transmission medium.

At least one transmission medium may be a wireless medium.

The amount of traffic allocated to a transmission medium may be greater than the capacity of the transmission medium.

Traffic classes of equal priority may be allocated to a transmission medium in a predetermined order.

The largest number of traffic classes may be allocated to the link.

The invention also provides a resource allocator for a transmission medium, in which data is associated with different classes of traffic, the different classes of traffic being associated with different priority levels, wherein the resource allocator is adapted to selectively reserve resources on the transmission medium for traffic classes in accordance with an associated priority level.

There may be a plurality of transmission media, there further being provided a rule allocator to determine the allocation of traffic to one or more of the transmission media, and a detector for detecting the status of the transmission media, wherein responsive to detection of failure of a transmission media, the resource allocator is adapted to allocate traffic allocated to the failed transmission media to one or more of the other transmission media.

The resource allocator may be adapted such that traffic allocated to the failed transmission media is allocated to one or more of the other transmission media in dependence on the traffic class.

The resource allocator may be adapted to reserve an amount of resource for at least one traffic class, said resource allocator being further adapted such that traffic associated with said traffic class is allocated to the reserved resource in accordance with an associated priority level.

The resource allocator may be further adapted such that if the resource reserved for the at least one traffic class is not fully utilised, data associated with a further traffic class is selectively allocated to any unused resource in accordance with an associated priority level.

A transmission medium may have a threshold level, the resource allocator being adapted to allocate to the transmission medium within the threshold level of the transmission medium. The threshold level may correspond to the maximum capacity of the transmission medium. The threshold level may be below the maximum bandwidth of the transmission medium. The threshold may be a value of 90% or more of the bandwidth of the transmission medium. Once the threshold is reached, the resource allocator may be adapted to allocate any remaining data to the medium on a best effort basis.

There may be provided a plurality of media. The resource allocator may be adapted to allocate a predetermined set of traffic to ones of the media.

Responsive to a failure of a transmission medium the resource allocator may be adapted to re-allocate a predetermined set of traffic allocated to that transmission medium to one or more other transmission media in combination with the predetermined traffic allocated to said one or more other transmission media.

The combined traffic associated with any transmission medium may be allocated thereto in dependence on the priority associated with respective traffic classes.

The priority may be based on a quality of service class.

The quality of service class may be based on one or more acceptable levels of: throughput; delay; loss; jitter; costs; or reliability for the traffic class.

The invention may further provide a resource allocator for allocating resources on transmission media having respective capacities, at least some data being associated with a traffic class having an associated priority level, the resource allocator including: a data allocator for allocating data to at least one transmission medium, and a detector for detecting failure of a transmission medium, wherein responsive to failure of a transmission medium, the data allocator is adapted such that traffic allocated to the failed transmission medium is allocated to at least one further transmission medium, the traffic being allocated thereto in accordance with a priority associated with the traffic.

The resource allocator may be adapted such that traffic is allocated to the at least one transmission medium until a capacity of the link is met.

The capacity of the transmission medium may be determined by the transmission medium bandwidth. The remaining traffic may be allocated to the transmission medium on a best effort basis.

Traffic from a failed transmission medium may be allocated to the at least one further transmission medium in preference to the original traffic on the at least one further transmission medium.

At least one traffic class may be identified as a critical service, the traffic allocator being adapted such that traffic being critical service traffic is first allocated in accordance with the relative priorities of such traffic, and then the remaining traffic is allocated in accordance with the relative priorities of such traffic.

The invention further provides a resource allocator for allocating traffic in which traffic is transmitted on at least two transmission media, traffic being associated with a traffic class, each traffic class being associated with a priority, and each media having a respective resource for traffic, the resource allocator being adapted such that responsive to a failure on one transmission medium, the combined traffic for the at least two transmission media is allocated to the remaining at least one transmission medium in dependence on the priority of the traffic class, wherein once the resource of the at least one remaining transmission medium has been used up, traffic associated with any remaining traffic is allocated to the at least one remaining transmission medium on a best-effort basis.

The invention still further provides a resource allocator for allocating traffic in a transmission medium, the resource allocator being adapted to allocate resource to traffic on a dynamic basis, wherein at least one type of traffic is reserved a fixed proportion of the resource of the transmission medium when present.

The at least one type of traffic may include voice or video traffic.

The invention may provide a resource allocator for allocating traffic in a transmission medium, wherein the transmission medium capacity is variable, the resource allocator being adapted to dynamically allocate traffic to the link in accordance with a traffic priority in dependence on a current capacity of the transmission medium.

At least one transmission medium may be a wireless medium.

The amount of traffic allocated to a transmission medium may be greater than the capacity of the transmission medium.

Traffic classes of equal priority may be allocated to a transmission medium in a predetermined order.

The largest number of traffic classes may be allocated to the link. When the total capacity of all the quality classes is more than the available link capacity, not all traffic class will be allocated. When the first quality class that will not be allocated in its entirety is arrived at, then with this feature some ordering of allocating of the traffic classes within the quality class is provided for, which preferably allows for the maximum number of traffic classes to be allocated. For example if only 50% of the quality classes can eb allocated, and it contains 10 traffic classes, nine of these small (in terms of bandwidth) representing say 40% of the quality class, and 1 large traffic class representing the other 60%, then the preferable order in which traffic classes would be allocated may be smallest first, so that all nine traffic classes are allocated. If the ordering was to start with the largest first, then potentially none of the traffic classes would be successfully allocated.

BRIEF DESCRIPTION OF THE FIGURES

The invention is now described with regard to particular examples by way of reference to the accompanying drawings in which.

DESCRIPTION OF THE PREFERRED EMBODIMENTS

The invention is now described by way of example, with reference to various preferred embodiments.

A first embodiment of the invention is described in the context of a traffic distribution or allocation scheme in which traffic is distributed or allocated onto one of three links; link A, link B, or link C. For the purposes of describing this first embodiment, it is assumed that one of the links fails, and the traffic originally allocated to the failing link is reallocated to the two remaining links, together with all the traffic originally allocated to the remaining two links, in accordance with the principles of the invention.

Figure 1:
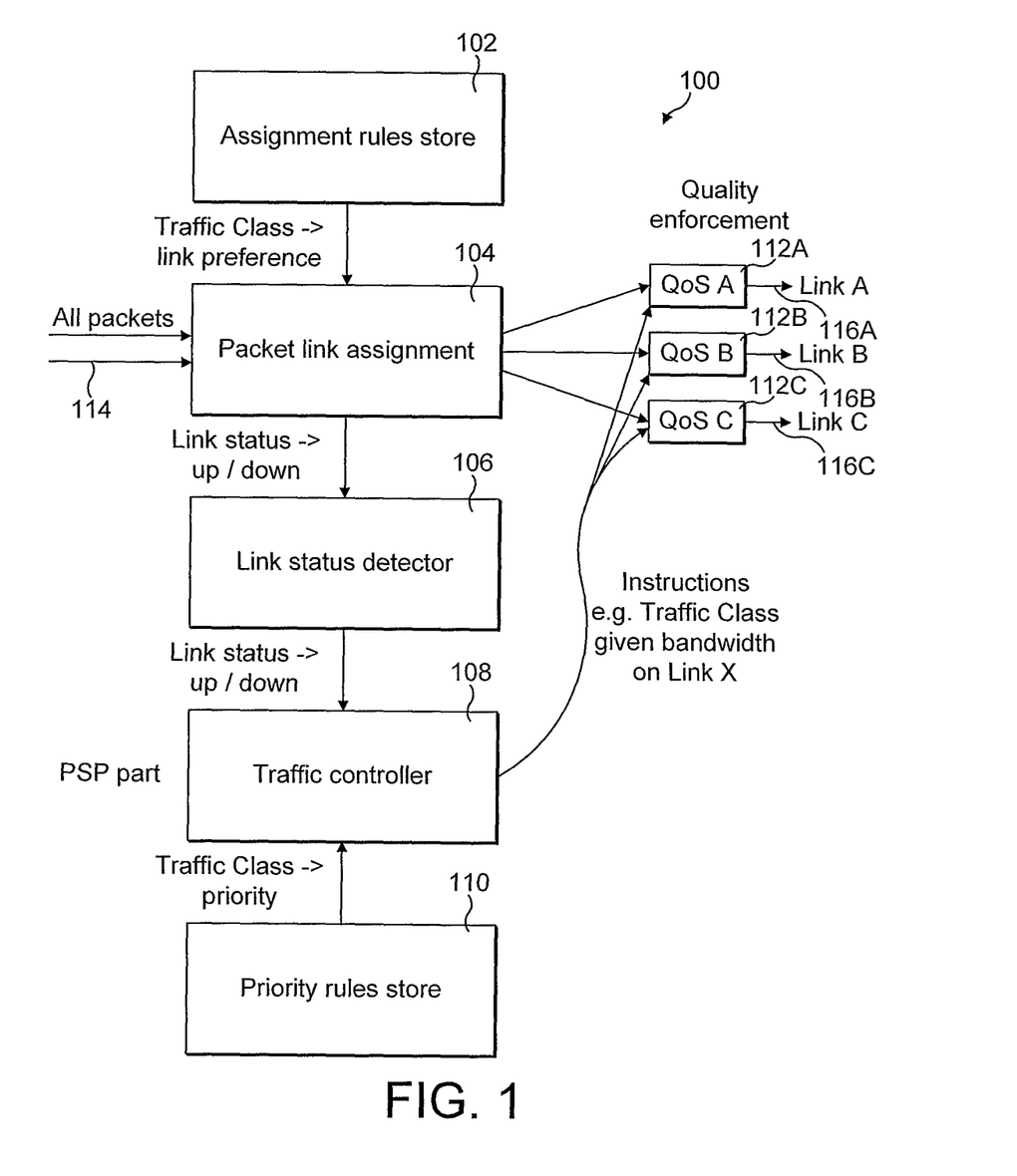
FIG. 1 illustrates a traffic distribution architecture in accordance with a first embodiment of the invention.

Referring to FIG. 1, there is illustrated an exemplary traffic distribution architecture in accordance with a first embodiment of the invention.

The traffic distribution architecture, generally designated by reference numeral 100, includes an assignment rules store 102, a packet link assignment block 104, a link status detector 106, a traffic controller 108, a priority rules store 110 and three quality enforcement blocks, respectively denoted $112_A$, $112_B$, and $112_C$.

In general, data packets arrive on input lines generally designated by reference numeral 114, and via the traffic distribution architecture are assigned to one of the three link outputs $116_A$, $116_B$, and $116_C$, associated with link A, link B, and link C respectively.

The data packets arriving on the input lines 114 may arrive on multiple input lines or a single input line. Buffering may be required at the input to buffer data packets for processing.

One or more data packets may be grouped together as traffic, or a traffic flow. A traffic class is a collection of traffic that a user or application has brought together. Thus a traffic class may comprise one or more data packets. Typically the traffic class may represent traffic belonging to a single user or single application.

Each data packet is thus associated with a particular traffic class, and each traffic class is further preferably associated with a priority level. The delivery of data packets on the input line or lines 114 is outside the scope of the invention, and data packets may be delivered to the input(s) of the traffic distribution architecture in any known way.

The traffic distribution architecture 100, in general, distributes data packets or traffic to one or more output links in accordance with at least one priority scheme providing a set of priority rules. The invention, and the various embodiments thereof described herein, are not limited to any particular priority scheme for traffic or data packets. An exemplary priority scheme which may be implemented in accordance with the various embodiments of the invention is, however, described with reference to FIG. 2. However the invention, and its embodiments, are not limited to the use of such a priority scheme.

Figure 2:
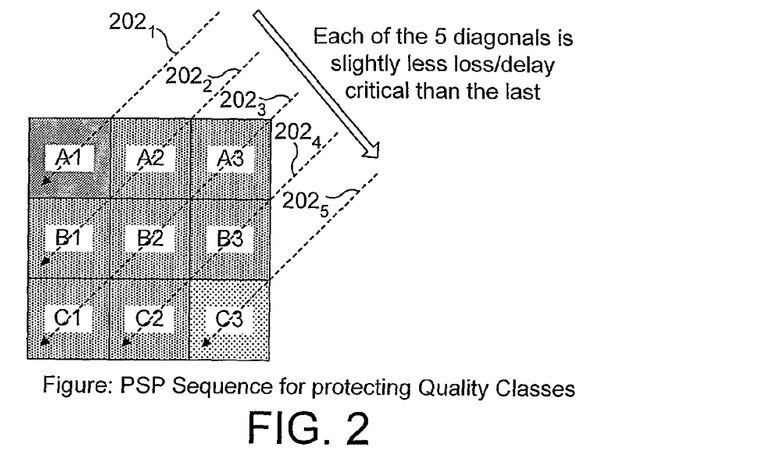
FIG. 2 illustrates the principles of a priority matrix which may be used in combination with embodiments of the invention.

With reference to FIG. 2, there is shown a two dimensional priority matrix suitable for implementation in conjunction with embodiments of the present invention. The two dimensional matrix in this embodiment establishes nine levels of priority, associated respectively with nine quality classes. Each quality class represents a level of priority. As illustrated in FIG. 2, the nine priority classes are denoted A1, A2, A3, B1, B2, B3, C1, C2, and C3. Although not illustrated in FIG. 2, all data packets which are not associated with one of the nine priority levels are prioritised on a best effort (BE) basis, which may be considered a tenth level of priority. The data packets that are handled as best effort traffic are typically not user defined; best effort is typically used for data packets or traffic which is downgraded by the system or for data packets or traffic which is otherwise unclassified.

The two dimensional matrix represents priority based on loss and delay. Loss is represented in the "Y" direction, and delay is represented in the "X" direction. The priority matrix is used such that traffic classes are allocated to links in accordance with the priority classes A1 . . . C3. A preferred use of the matrix of FIG. 2 in combination with embodiments of the invention is discussed further hereinbelow.

Referring again to FIG. 1, in normal operation, where all links are operational, incoming data packets are assigned to one of the three available links in accordance with their traffic class.

Thus the data packets arriving on the input lines 114 are processed in the packet link assignment block 104. The packet link assignment block 104 retrieves assignment rules from the assignment rules store 102. Based on the traffic class associated with any data packet, the assignment rules store 102 provides a link preference for that data packet. The packet link assignment block 104 then assigns the packet to the associated one of the quality enforcement blocks 112 for the selected link. Any necessary quality of service for the data packet is then enforced in the block 112, before transmission on the appropriate link output 116.

The link status detector 106 constantly monitors in real time the availability of all of the links A, B and C. For the purposes of describing the preferred embodiment, there is assumed a scenario where a link is either "up" and 100% operational, or "down" and 100% unusable. In alternatives, however, a link may partially fail such that the capacity of such link is reduced.

In the preferred embodiment, as long as all links are "up", the packet link assignment block 104 operates as described above to allocate data packets to the appropriate quality enforcement block in dependence on the assignment rule for the traffic class with which that data packet is associated.

When the link status detector 106 detects that any one of the links A, B or C is "down", then the allocation of data packets to the links is controlled in accordance with the first embodiment of the invention. This control is further described with reference to FIG. 1 and additional reference to the flow chart of FIG. 3.

Figure 3:
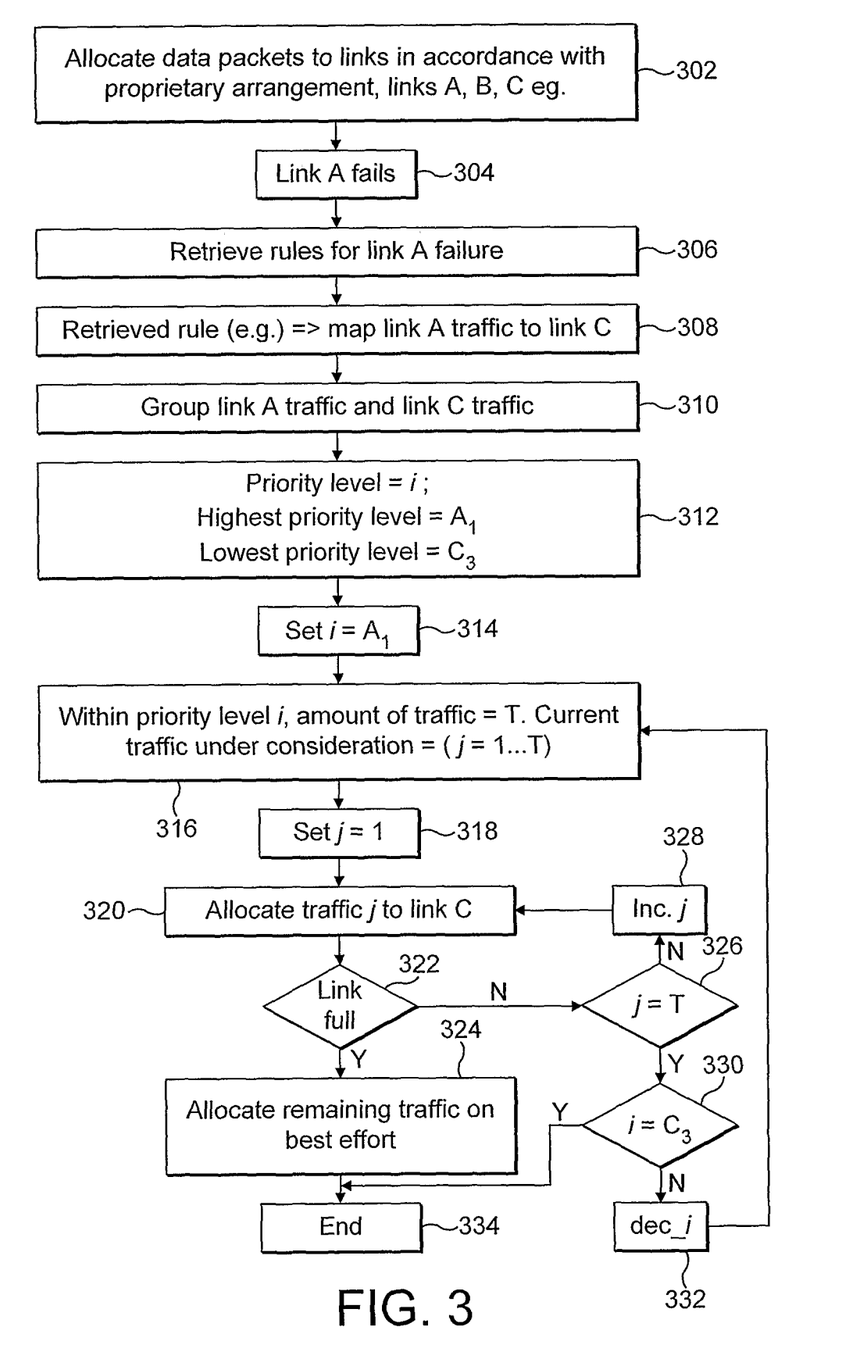
FIG. 3 illustrates a sequence of method steps in accordance with a first embodiment of the invention.

Referring to FIG. 3 step 302 illustrates the normal operation of the distribution architecture as described above, wherein the packet link assignment block 104 allocates data packets to the links in accordance with the assignment rules. Step 304 represents the detection of a failed link. For the purposes of description, it is assumed that link A fails, and that the link status detector block 106 detects that link A is "down".

In the preferred embodiment, when a data packet arrives at the packet link assignment block 104, the assignment rule retrieved from the assignment rules store 102 has two components, the link to which the data packet should be assigned and a reserve link which the data packet should be assigned to in the event of the unavailability of the main link. Thus, in the event that the main link for a data packet has failed, the assignment rule provides a reserve link which the packet should be assigned to. In this way in the event of the packet link assignment block 104 being provided with an assignment rule to assign a data packet to a failed link, there is immediately available a reserve link to which the data packet should be routed. In an alternative embodiment, there may be provided two assignment rules stores, one providing the link to which the data packet is to be assigned, and one which the packet link assignment block accesses to retrieve a reserve link in the event that the link provided by the main assignment rules store has failed.

Thus in a step 306 the packet link assignment block 104 retrieves the rule for assigning the data packet to a reserved link in the event of a main link failure. In the example of a data packet being received for which the main link is link A, the packet link assignment block 104 is also preferably presented with the identity of the reserve link, e.g. link C.

In a step 308 the packet link assignment block 104 determines the reserve link assignment. The mapping of traffic from a failed link to another link may be done in a number of ways. For example, in a simple implementation all traffic on a failed link may be assigned to one other link. Thus in a simple example where link A fails, the assignment rules may simply determine that all traffic on link A is to be assigned to link C. In a more preferred implementation, an assignment rule will be determined based on the traffic class. Thus there will be an assignment rule for each traffic class for the failed link. Thus traffic on the failing link may be assigned to several other links. For the purposes of this example, however, it is considered that all traffic on the failed link A is mapped to link C.

In a step 310, the packet link assignment block 104 groups all the traffic which is to be allocated to a given link. In this simple example, all the traffic to be assigned to link A (which has failed) is grouped with the traffic to be assigned to link C, and all this traffic is now to be allocated to link C.

The traffic controller 108, in normal operation, retrieves rules from the priority rules store 110 for determining the treatment of data packets associated with different traffic classes for allocation on a link. The traffic controller allocates bandwidths to traffic classes, depending on the available bandwidth in the link and the priority rules for the traffic to be allocated to that link. Preferably the priority rules are based on the priority matrix illustrated in FIG. 2. However the embodiment is not limited to the use of such a priority matrix, and any other mechanism for traffic allocation may be used, whether based on priority or otherwise, and whether based on a priority matrix or other priority scheme.

In the event that any link fails, then the traffic controller 108 must allocate the grouped traffic for any other link, including the traffic from the failed link which has been allocated to that link, in accordance with the priority rules retrieved from the priority rules store block 110.

As denoted in step 312, a current priority level of traffic under consideration is denoted i, and with reference to the priority matrix of FIG. 2 the highest determined priority level is A1 and the lowest determined priority level is C3. After the determined priority levels, all other traffic is allocated to a best effort level, which may be considered the lowest overall priority level. In a step 314 the current priority level i is initially set to A1.

In a step 316, the allocation of the traffic is initiated. Within a given priority level i, the number of traffic classes is T. The current traffic class under consideration is denoted j, where j is in the range 1 to T.

In a block 318 j is set to 1. Thus the traffic allocation begins by looking at the first traffic class within the highest priority level of the priority matrix. In a step 320 the traffic class j is allocated to the link determined by the packet link assignment block 104, in this case being link C. This is denoted by block 320. In a step 322 it is then determined by the traffic controller 108 whether that link is full. If the link is not full, then in a step 326 it is determined whether j is equal to T, i.e. whether all traffic classes within the priority level i have been processed. In the event that is not the case, then in step 328 the value of j is incremented, and the step 320 replaced for the next traffic class within the priority level.

If in step 326 it is determined that j is equal to T, then all traffic classes within a particular priority level have been dealt with, and the allocation operation moves on to the next priority level. In a step 330 it is determined whether i is equal to C3. C3 is the lowest priority level (before best effort), and if i is equal to C3 in step 330 then this means all traffic classes for all priority levels have been allocated and the allocation process can terminate in step 334, subject to the transmission of any best effort traffic.

In the event that i is not equal to C3 in step 330, then in step 332 i is decremented, i.e. i is set at the next lowest priority level, and the sequence of steps is repeated for allocating the traffic classes within that priority level.

If in step 322 it is determined that the link to which traffic is being allocated is full, then the remaining traffic is allocated to the link in a step 324 on a "best effort" basis.

It will be appreciated that the above allocation steps may be applied for allocating traffic to any given link. Thus, the above allocation steps are used to allocate traffic to any one of the links A, B or C, when that link is "up". When a link has failed, then the assignment of the traffic associated with that link to a reserve link means that the reserve link is required to carry an increased volume of data packets, which may result in traffic associated with a larger number of lower priority levels being handled on a "best effort" basis.

The mechanism provided by the invention, in the above-described embodiment, is intended to maximise the chances of performance-sensitive traffic surviving one or more link failures, with no user involvement required. Full "quality" treatment is maintained for as many traffic classes as possible, starting at the top left of the quality grid as shown in FIG. 2.

In a preferred, but not essential, arrangement, where the preferred priority matrix of FIG. 2 is utilised, the priority matrix is traversed in a diagonal fashion, as illustrated by the dashed lines $202_1$ to $202_5$. Each of the five diagonal lines is slightly less loss/delay critical than the previous one. Thus the assessment of traffic within priority groups is in the order A1-A2-B1-A3-B2-C1-B3-C2-C3.

In applying this mechanism, there is no reduction of committed rates, as this might imply a minimum bandwidth requirement for a given application to function, for example sharing the bandwidth may stop an application working, even if it has highest priority.

In general, in determining the allocation of traffic to a link, the allocation algorithm may not allocate traffic on the basis of the link not being full, but may allocate traffic on the basis the link is within a certain proportion of being full, for example 90%. Thus, referring to FIG. 3, in step 322 it may be determined whether a threshold level has been reached rather than whether the link is full. The threshold level may preferably be a percentage or fraction of the full link capacity.

The allocation algorithm takes all traffic which is to be normally assigned to a link, together with any traffic which is being assigned to that link as a reserve link, for the highest priority level, and if this total traffic is within a threshold of the links total allowed bandwidth, then all traffic within this priority level is preserved and is transmitted with its originally quality requirements intact. This process is then repeated for each subsequently decreasing level of priority.

As soon as a traffic class is encountered for which there is insufficient bandwidth remaining in the link (within the preferred threshold limit for committed traffic) to satisfy the committed rates specified for traffic in that traffic class, aggregated from the traffic assigned to that link and the traffic assigned to that link as a reserve link, then any remaining traffic classes for that quality class and all traffic classes in subsequent quality classes are treated on a "best effort" basis.

The benefits of utilising the principles of the present invention to allocate traffic in the event of a link failure include ensuring that traffic which represents applications with critical bandwidth requirements have their full committed rates honoured, if at all possible, so that applications will not "starve". The approach also employs a simple user model, such there is no need to set any additional bandwidths/behaviours, and cascading behaviour is automatic. The technique is also scalable to multiple links, within reason. An end user's performance-critical traffic always has the best chance of survival, however many links have failed.

One factor which the above-described technique does not fully allow for is scenarios which would otherwise be better handled via a "reserved bandwidth" approach. This can be best understood by way of reference to a simple example. In a simple example, there may be provided two links. A first link is a 2 Mbps link for important traffic, and a second link is a 5 Mbps link for low importance traffic. In the event that the first link fails, the user would prefer for all quality of service requirements specified for the first link to be honoured. That is, all A1 traffic must continue to get A1 treatment, C3 traffic must continue to get C3 treatment etc. The user fully accepts that the traffic associated with the second link, even including the A1 traffic, may be displaced into best effort as a result. It will be understood from the foregoing description with reference to FIGS. 2 and 3 that the preferred embodiment described therein does not accommodate this scenario.

It is also possible that there may be cases where certain specific services from any link must not fail if at all possible, regardless of their loss/delay or other quality of service requirements If the user has a critical service across a particular link which runs perfectly well in priority class C3 (not being especially loss/delay-sensitive), but which must not be terminated altogether, then the approach described above with reference to FIGS. 2 and 3 may be insufficient if that link fails. For example A1, A2 and B1 traffic may still be provided with their committed bandwidths, but traffic in any other quality class (including C3) may be downgraded to best effort. In this way the user's preference for C3 traffic to be maintained is not achieved.

As such, in a further preferred embodiment, the first embodiment described hereinabove is further adapted to include a "critical service" flag. Any traffic class may be given a critical service flag. The critical service flag traffic is allocated before non-critical service flag traffic for all priority levels. In general, the priority matrix of FIG. 2 is traversed for all traffic being associated with a critical service flag, and then the matrix is traversed again for all traffic not being associated with a critical service flag.

Thus, in summary, a specified committed rate is allocated for any traffic marked as being "critical service" in the order A1-A2-B1-A3-B2-C1-B3-C2-C3. Thereafter, the specified committed rate for any traffic which is not marked as being "critical service" is reserved in the order A1-A2-B1-A3-B2-C1-B3-C2-C3.

In the event that any link fails, and traffic from that link is assigned to another link, then on that other link the original traffic plus any traffic re-directed thereto from the failed link, is grouped and allocated in the described way, including use of the critical service flag.

Refining of the first embodiment to include a critical service flag for each traffic class (where appropriate) provides a useful default behaviour without the need for any user input, while still providing a reasonable amount of flexibility for advanced users. For example, the scenario above with two links of respective capacities 2 Mbps and 5 Mbps may be accommodated by setting all the traffic on the 2 Mbps link to be critical service traffic. This guarantees that that traffic takes precedence over the less critical traffic already allocated to the 5 Mbps link, with minimal effort on the part of the user (and no requirement for bandwidth calculations), while still providing normal performance for the loss/delay critical services normally allocated to the 5 Mbps link.

A second embodiment of the invention is now described. The second embodiment of the invention may be applied to a single link, although the principles thereof may be extended to individual links of a multiple link group.

In this second preferred embodiment, it is assumed that there is a link which is fully available for use by data applications. Data packets are assigned to the link using any given assignment arrangement, such as the assignment arrangement discussed hereinabove with reference to the first embodiment. The data assigned to the link may include data which has been assigned thereto responsive to the failure of another link.

The user may also require that when a particular type of traffic arrives, the necessary bandwidth is allocated on the link to guarantee the support for this data.

In a more specific example, a basic user of a quality of service (QoS) enabled voice over internet protocol (VoIP) data product may want to specify a number of calls that they may wish to ensure work, while allowing other data applications to otherwise use the rest of the link. As each call is initiated, the necessary amount of bandwidth is "stolen" from the other data applications, and allocated dynamically to the VoIP call. This means that the whole link is available for other data applications usage when there are no VoIP calls in progress.

Figure 4:
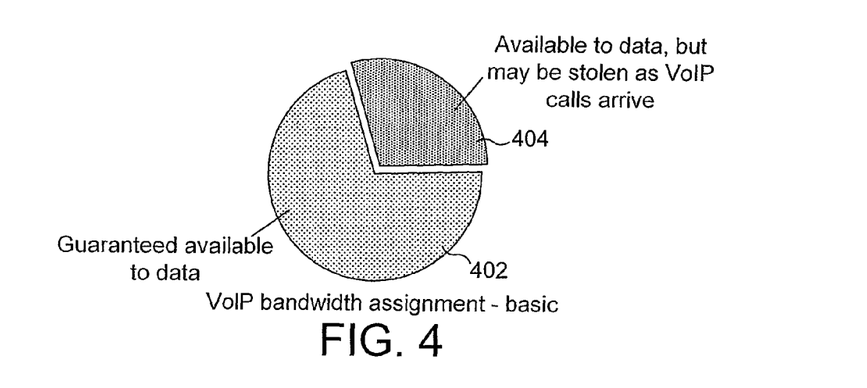
FIG. 4 is a graphic illustration of traffic allocation in a second embodiment of the invention.

This is illustrated graphically by FIG. 4, where it can be seen that a certain portion of the available bandwidth, denoted by reference numeral 402, is always guaranteed as being available for general data usage. A further portion, denoted by reference numeral 404, is usually available for general data usage, but in the event of VoIP calls arriving is reserved for those VoIP calls and not available for general data use. The proportion of the bandwidth which is reserved for VoIP calls, when VoIP calls are present, is determined by the number of VoIP calls which must be guaranteed, and the size of each individual VoIP call.

As an example, a user may configure a product to allow up to 25 calls to co-exist on a link with their other data traffic. As the calls arrive the correct amount of bandwidth is allocated to support the codec of the call, and the proportionate amount of bandwidth available to other general data is reduced. If a $26^{th}$ concurrent calls arrives, the QoS functionality of the product processes this call on a "best effort" basis. That is, the call would not have protection from the general data traffic, and is only processed if the general data traffic is not fully utilising the available bandwidth for the data traffic. If integrated with a VoIP proxy, a quality of service mechanism may be configured to also send the proxy a "recommend not to accept this call" message.

In this second embodiment, the management of the allocation of data to the link, or the allocation of link resources to data, may be handled using quality classes and the two dimensional priority matrix as illustrated in FIG. 2. When bandwidth is reallocated from data to voice calls, the decision as to which data streams lose out may be made using the existing priority service protection algorithm as discussed hereinabove with relation to FIGS. 2 and 3, but in a reverse manner to the way in which it is used for allocating traffic from failed links. This uses the pre-assigned loss and delay priority from the two dimensional priority grid of FIG. 2 to make intelligent decisions about which data is more valuable.

Figure 5:
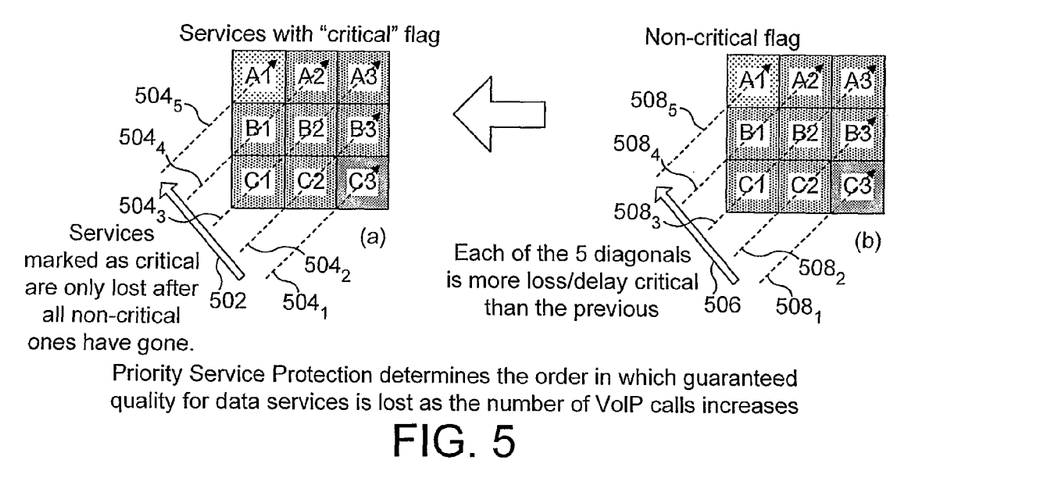
FIGS. 5(a) and 5(b) illustrate the principles of the priority matrix of FIG. 2 when used in combination with the principles of the second embodiment of the invention.

Referring to FIG. 5, this is illustrated graphically, assuming that the optional critical service flag is also employed.

As can be seen from the graphical representation of FIG. 5, when data traffic must be downgraded to best effort to make way for a VoIP call (or any other type of traffic for which service is guaranteed), the existing data is downgraded in order of lowest priority. Thus any C3 traffic is first downgraded to best effort.

Where the critical service flag is in use, the priority matrix of FIG. 2 is traversed is reverse order for non-critical services, and then traversed in reverse order for critical services. Thus referring to FIG. 5, in FIG. 5b the priority matrix is traversed, as denoted by arrow 506, in reverse order for non-critical services, the diagonals $508_1$ to $508_5$ denoting the order through the matrix. As illustrated by FIG. 5(b), the order is C3-C2-B3-C1-B2-A3-B1-A2-A1. Thereafter the matrix is traversed for critical services, in reverse order as denoted by arrow 502, for the diagonals $504_1$ to $504_5$, the order again being C3-C2-B3-C1-B2-A3-B1-A2-A1. The matrices shown in FIGS. 5b and 5a are traversed in reverse order until such a point as the volume of data traffic can be accommodated within the bandwidth remaining for data traffic.

Thus, in the second embodiment of the invention, a given link is used in its entirety by data traffic until a VoIP call arrives, and then the right amount of quality (bandwidth, loss, delay and other resources—such as cost—as necessary) is allocated to the VoIP call when it arrives, such that the call is given appropriate quality treatment. The allocation of bandwidth may factor costs, by including the monetary value of using the bandwidth in determining the capacity of the link to be allocated to any given type of traffic. The "stealing" of this capacity from the link from other data applications is handled by downgrading, in order of reverse priority, the other data applications.

A third embodiment of the invention is described with reference to FIG. 6. In a third embodiment, the invention is applied to a wireless application where a link is provided which has a variable link rate. The link rate may vary, for example, due to wireless network conditions.

Figure 6:
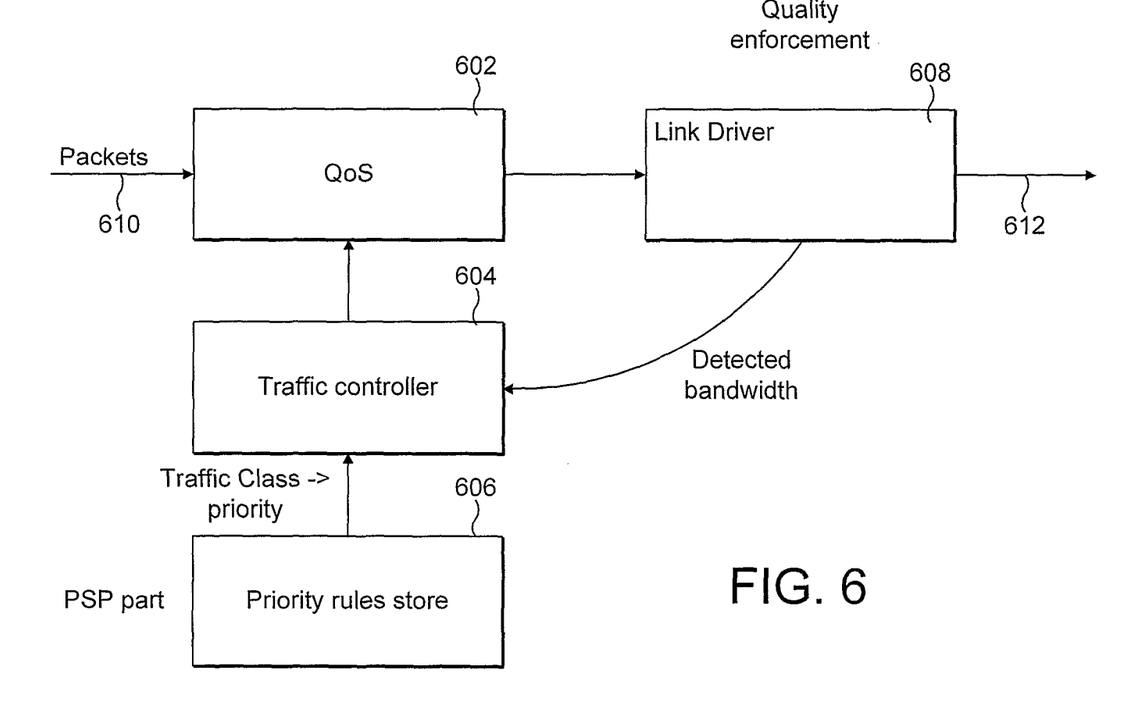
FIG. 6 illustrates a traffic distribution architecture in accordance with a third embodiment of the invention.

Referring to FIG. 6, the distribution or allocation architecture for such an application includes a quality of service block 602, a traffic controller 604, a priority rules store 606, and a link driver 608. Packets arrive on an interface 610, and are output on a link 612. The quality of service block 602 applies quality of service controls to the received packets, and forwards them to the link driver 608 for transmission on the link. The link driver 608 determines the maximum link speed available, based on the wireless network conditions, and provides information on the current available bandwidth to the traffic controller 604. The traffic controller 604 allocates link bandwidth to the traffic classes of the incoming data packets depending on the detected bandwidth and the priority rules stored in the priority rules store 606. Thus, the traffic controller 604 allocates the incoming data packets to the link driver 608 in accordance with the priority allocation techniques described hereinabove with reference to FIGS. 2 and 3 in the first embodiment.

The invention has been described herein by way of examples where data packets associated with traffic classes are allocated to one or more links. In general, however, the principles of the invention extend to any scenario where resources on a medium must be distributed such that data may be transmitted on the medium. The medium may be a physical or logical link.

The invention has been described herein by way of reference to preferred embodiments and examples. It will be understood by one skilled in the art that the invention has more general applicability than the specific examples presented herein. The scope of the invention is defined by the appended claims.

The invention claimed is:

1. A method of allocating resources in a plurality of transmission media, in which method data is associated with different classes of traffic, the different classes of traffic being associated with different priority levels, wherein resources are selectively reserved on the transmission media for traffic classes in accordance with the associated priority level; the method comprising;

allocating, with a microprocessor running a resource allocator, a predetermined set of traffic to ones of the media; and  responsive to a failure of a transmission medium, re-allocating, by the resource allocator, the predetermined traffic allocated to that transmission medium to one or more other transmission media in combination with the predetermined traffic allocated to said one or more other transmission media without changing the priority levels associated with the predetermined traffic;

wherein in the event that the one or more other transmission media do not have the capacity to take the existing traffic in addition to traffic from the failed transmission medium, the combined traffic thus associated with any transmission medium is allocated thereto, by the resource allocator, in dependence on the priority associated with respective traffic classes, by:

allocating a first traffic class within the highest priority level to the one or more other transmission media;

determining whether the one or more other transmission media are full;

if it is determined that the one or more other transmission media are not full, determining whether all traffic classes within the highest priority level have been processed; and   if it is determined that not all traffic classes within the highest priority level have been processed, repeating the traffic allocation steps for the next traffic class within the priority level.

2. A method according to claim 1 wherein there is provided a plurality of transmission media, allocation rules determining the allocation of traffic to one or more of the transmission media, wherein responsive to failure of transmission media traffic allocated to the failed transmission media is allocated to one or more of the other transmission media.

3. A method according to claim 2 wherein traffic allocated to the failed transmission media is allocated to one or more of the other transmission media in dependence on the traffic class.

4. A method according to claim 1 wherein the step of selectively reserving resources on the transmission medium includes reserving an amount of resource for at least one traffic class, where traffic associated with said traffic class is allocated to the reserved resource in accordance with an associated priority level.

5. A method according to claim 4 wherein if the resource reserved for the at least one traffic class is not fully utilised, data associated with a further traffic class is selectively allocated to any unused resource in accordance with an associated priority level.

6. A method according to claim 1 wherein a transmission medium has a threshold level, the traffic being allocated to the transmission medium within the threshold level of the transmission medium.

7. A method according to claim 6 wherein the threshold level corresponds to the maximum capacity of the transmission medium.

8. A method according to claim 6 wherein the threshold level is below the maximum bandwidth of the transmission medium.

9. A method according to claim 8 wherein the threshold is a value of 90% or more of the bandwidth of the transmission medium.

10. A method according to claim 6 wherein once the threshold is reached, any remaining data is allocated to the medium on a best effort basis.

11. A method according to claim 1 wherein the priority is based on a quality of service class.

12. A method according to claim 11 wherein the quality of service class is based on one or more acceptable levels of: throughput; delay; loss; jitter; costs; or reliability for the traffic class.

13. A method according to claim 1 wherein at least one traffic class is identified as a critical service, wherein traffic being critical service traffic is first allocated in accordance with the relative priorities of such traffic, and then the remaining traffic is allocated in accordance with the relative priorities of such traffic.

14. A method according to claim 1, comprising allocating resource to traffic on a dynamic basis, wherein at least one type of traffic is reserved a fixed proportion of the resource of the transmission medium when present.

15. A method according to claim 14 wherein the at least one type of traffic includes voice or video traffic.

16. A method according to claim 1, wherein a transmission medium capacity is variable, the method further comprising dynamically allocating traffic to that transmission medium in accordance with a traffic priority in dependence on a current capacity of that transmission medium.

17. A method according to claim 1 wherein at east one transmission medium is a wireless medium.

18. A method according to claim 1 wherein the amount of traffic allocated to a transmission medium is greater than the capacity of the transmission medium.

19. A method according to claim 1 wherein traffic classes of equal priority are allocated to a transmission medium in a predetermined order.

20. A method of allocating resources on transmission media having respective capacities, at least some data being associated with different classes of traffic, the different classes of traffic being associated with different priority levels, the method comprising allocating data, by a resource allocator on a traffic controller, to at least one transmission medium, wherein responsive to failure of a transmission medium, the traffic allocated to the failed transmission medium is allocated, by the resource allocator, to at least one further transmission medium without changing the priority levels associated with the traffic; wherein in the event that the at least one further transmission medium does not have the capacity to take existing traffic in addition to the traffic from the failed transmission medium, the combined traffic is allocated thereto, by the resource allocator, in accordance with a priority associated with the traffic and wherein allocating the combined traffic, by the resource allocator, comprises:

allocating a first traffic class within the highest priority level to the at least one further transmission medium;

determining whether the at least one further transmission medium is full;

if it is determined that the at least one further transmission medium is not full, determining whether all traffic classes within the highest priority level have been processed; and  if it is determined that not all traffic classes within the highest priority level have been processed, repeating the traffic allocation steps for the next traffic class within the priority level.

21. A method according to claim 20 wherein the traffic is allocated to the at least one transmission medium until a capacity of the link is met.

22. A method according to claim 21 wherein the capacity of the transmission medium is determined by the transmission medium bandwidth.

23. A method according to claim 21 wherein the remaining traffic is allocated to the transmission medium on a best effort basis.

24. A method of allocating traffic in accordance with claim 20 wherein traffic from a failed transmission medium is allocated to the at least one further transmission medium in preference to the original traffic on the at least one further transmission medium.

25. A traffic distribution architecture comprising:
a resource allocator for a plurality of transmission media, in which data is associated with different classes of traffic, the different classes of traffic being associated with different priority levels, wherein the resource allocator is adapted to selectively reserve resources on the transmission media for traffic classes in accordance with associated priority levels;
a rule allocator to determine the allocation of traffic to one or more of the transmission media, and
a detector for detecting the status of the transmission media;
the resource allocator being adapted to, responsive to detection of failure of a transmission media, allocate traffic allocated to the failed transmission media to one or more of the other transmission media without changing the priority levels allocated to the traffic; and
the resource allocator being further adapted to allocate traffic allocated to the failed transmission media to one or more of the other transmission media in dependence on the traffic class in the event that the one or more other transmission media do not have the capacity to take the existing traffic in addition to traffic from the failed transmission medium, wherein for allocating the traffic to the one or more other transmission media the resource allocator is adapted to:
allocate a first traffic class within the highest priority level to the one or more other transmission media;
determine whether the one or more other transmission media are full;
if it is determined that the one or more other transmission media are not full, determine whether all traffic classes within the highest priority level have been processed; and
if it is determined that not all traffic classes within the highest priority level have been processed, repeat the traffic allocation steps for the next traffic class within the priority level.

26. A traffic distribution architecture according to claim 25 wherein the resource allocator is adapted to reserve an amount of resource for at least one traffic class, said resource allocator being further adapted such that traffic associated with said traffic class is allocated to the reserved resource in accordance with an associated priority level.

27. A traffic distribution architecture according to claim 26 further adapted such that if the resource reserved for the at least one traffic class is not fully utilised, data associated with a further traffic class is selectively allocated to any unused resource in accordance with an associated priority level.

28. A traffic distribution architecture according to claim 25 wherein a transmission medium has a threshold level, the resource allocator being adapted to allocate to the transmission medium within the threshold level of the transmission medium.

29. A traffic distribution architecture according to claim 28 wherein the threshold level corresponds to the maximum capacity of the transmission medium.

30. A traffic distribution architecture according to claim 28 wherein the threshold level is below the maximum bandwidth of the transmission medium.

31. A traffic distribution architecture according to claim 30 wherein the threshold is a value of 90% or more of the bandwidth of the transmission medium.

32. A traffic distribution architecture according to claim 28 wherein once the threshold is reached, the resource allocator is adapted to allocate any remaining data to the medium on a best effort basis.

33. A traffic distribution architecture according to claim 25 wherein there is provided a plurality of media.

34. A traffic distribution architecture according to claim 33 wherein the resource allocator is adapted to allocate a predetermined set of traffic to ones of the media.

35. A traffic distribution architecture according to claim 33, wherein responsive to a failure of a transmission medium the resource allocator is adapted to re-allocate a predetermined set of traffic allocated to that transmission medium to one or more other transmission media in combination with the predetermined traffic allocated to said one or more other transmission media.

36. A traffic distribution architecture according to claim 35 wherein the combined traffic thus associated with any transmission medium is allocated thereto in dependence on the priority associated with respective traffic classes.

37. A traffic distribution architecture according to claim 25 wherein the priority is based on a quality of service class.

38. A traffic distribution architecture according to claim 37 wherein the quality of service class is based on one or more acceptable levels of: throughput; delay; loss; jitter; costs; or reliability for the traffic class.

39. A traffic distribution architecture in accordance with claim 25 wherein traffic from a failed transmission medium is allocated to the at least one further transmission medium in preference to the original traffic on the at least one further transmission medium.

40. A traffic distribution architecture according to claim 25 wherein at least one traffic class is identified as a critical service, the traffic allocator being adapted such that traffic being critical service traffic is first allocated in accordance with the relative priorities of such traffic, and then the remaining traffic is allocated in accordance with the relative priorities of such traffic.

41. A traffic distribution architecture according to claim 25, being adapted to allocate resource to traffic on a dynamic basis, wherein at least one type of traffic is reserved a fixed proportion of the resource of the transmission medium when present.

42. A traffic distribution architecture according to claim 41 wherein the at least one type of traffic includes voice or video traffic.

43. A traffic distribution architecture according to claim 25, wherein the transmission medium capacity is variable, the resource allocator being adapted to dynamically allocate traffic to the link in accordance with a traffic priority in dependence on a current capacity of the transmission medium.

44. A traffic distribution architecture according to claim 25 wherein at least one transmission medium is a wireless medium.

45. A traffic distribution architecture according to claim 25 wherein the amount of traffic allocated to a transmission medium is greater than the capacity of the transmission medium.

46. A traffic distribution architecture according to claim 25 wherein traffic classes of equal priority are allocated to a transmission medium in a predetermined order.

47. A traffic controller for allocating resources on transmission media having respective capacities, at least some data being associated with different classes of traffic, the different classes of traffic being associated with different priority levels, the traffic controller including: a data allocator for allocating data with a microprocessor to at least one transmission medium, and a detector for detecting failure of a transmission medium; wherein responsive to failure of a transmission medium, the data allocator is adapted such that traffic allocated to the failed transmission medium is allocated to at least one further transmission medium without changing the priority level allocated to the traffic, the traffic being allocated thereto in accordance with a priority associated with the traffic in the event that the at least one further transmission medium does not have the capacity to take the existing traffic in addition to traffic from the failed transmission medium, wherein for allocating the traffic to the at least one further transmission medium the data allocator is adapted to:
- allocate a first traffic class within the highest priority level to the at least one further transmission medium;
- determine whether the at least one further transmission medium is full;
- if it is determined that the at least one further transmission medium is not full, determine whether all traffic classes within the highest priority level have been processed; and
- if it is determined that not all traffic classes within the highest priority level have been processed, repeat the traffic allocation steps for the next traffic class within the priority level.

48. A traffic controller according to claim 47 adapted such that traffic is allocated to the at least one transmission medium until a capacity of the link is met.

49. A traffic controller according to claim 48 wherein the capacity of the transmission medium is determined by the transmission medium bandwidth.

50. A traffic controller according to claim 49 wherein the remaining traffic is allocated to the transmission medium on a best effort basis.

51. A traffic distribution architecture comprising:
a resource allocator for allocating traffic in which traffic is transmitted on at least two transmission media, traffic being associated with a traffic class, each traffic class being associated with a priority, and each media having a respective resource for traffic, the resource allocator being adapted such that responsive to a failure on one transmission medium, the combined traffic for the at least two transmission media is allocated to the remaining at least one transmission medium without changing the priority associated with the traffic and in dependence on the priority of the traffic class, wherein once the resource of the at least one remaining transmission medium has been used up, traffic associated with any remaining traffic is allocated to the at least one remaining transmission medium on a best-effort basis, wherein for allocating the traffic to the remaining at least one transmission medium the resource allocator is adapted to:
allocate a first traffic class with the highest priority to the remaining at least one transmission medium;
determine whether the remaining at least one transmission medium is full;
if it is determined that the remaining at least one transmission medium is not full, determine whether all traffic classes with the highest priority have been processed; and
if it is determined that not all traffic classes with the highest priority have been processed, repeat the traffic allocation steps for the next traffic class with the priority level.

* * * * *